United States Patent
Yoshida et al.

(10) Patent No.: US 6,538,769 B2
(45) Date of Patent: *Mar. 25, 2003

(54) IMAGE PROCESSING APPARATUS

(75) Inventors: Akinori Yoshida, Nishio (JP); Hiroaki Ikeda, Toyokawa (JP); Motomi Takemoto, Toyokawa (JP); Tomokazu Kato, Toyokawa (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,344

(22) Filed: Jun. 5, 1998

(65) Prior Publication Data

US 2002/0001094 A1 Jan. 3, 2002

(30) Foreign Application Priority Data

Jun. 6, 1997 (JP) .............................................. 9-148759

(51) Int. Cl.⁷ .............................................. H04N 1/407
(52) U.S. Cl. ......................................... 358/1.9; 358/527
(58) Field of Search ................................. 358/1.9, 1.13, 358/1.18, 467, 527, 1.4, 2.1; 382/314, 317

(56) References Cited

U.S. PATENT DOCUMENTS

| | | | |
|---|---|---|---|
| 5,032,904 A | * 7/1991 | Murai et al. | 358/75 |
| 5,317,420 A | * 5/1994 | Kuwahara | 358/463 |
| 5,706,368 A | * 1/1998 | Mita | 382/284 |
| 5,734,758 A | * 3/1998 | Yamamoto et al. | 382/274 |
| 5,805,970 A | * 9/1998 | Kasamatsu | 399/376 |
| 5,861,960 A | * 1/1999 | Suzuki et al. | 358/432 |

* cited by examiner

Primary Examiner—Thomas D. Lee
Assistant Examiner—Stephen Brinich
(74) Attorney, Agent, or Firm—Morrison & Foerster LLP (57) ABSTRACT

An image processing apparatus discriminates whether an original document is a color original document or a monochrome original document based on image data and performs image processing in an operational mode based on the result thereof. The image processing apparatus discriminates whether an image background area is color, and if a background area is determined to be color, the image processing apparatus provides image processing to the original document as a monochrome original document, in an operational mode used for a monochrome original document.

15 Claims, 12 Drawing Sheets

IMAGE PROCESSING APPARATUS

RELATED APPLICATION

This application is based on application No. HEI 9-148759 filed in Japan, the content of which is hereby incorporated by reference.

BACKGROUND OF THE INVENTION

1. Field of the Invention

The present invention concerns an image processing apparatus which performs data processing for image reproduction of original document photographic data obtained by a color imaging device, and the present invention is ideal for a color copying machine.

2. Description of the Related Art

A color copying machine (copier) generally performs color reproduction using four colored toners of cyan (C), magenta (M), yellow (Y), and black (K). Such a machine also possesses a monochrome mode using a black toner alone. Monochrome copying requires approximately one-fourth of the time and costs less than color copying in which four colored toners are superimposed in turn.

An ACS (Auto Color Selection) function, which discriminates whether an original document is a color document or a monochrome document and sets a copying mode corresponding to the original document, has heretofore been made practical. This function is particularly useful in instances where many original documents are copied using an ADF (automatic document feeder). There is no need for a user to distinguish between color documents and monochrome documents, and when multiple original documents are placed in an ADF and a start key is pressed, color copying is performed for color documents and monochrome copying for monochrome documents.

A so-called colored paper or a discolored white paper bearing monochrome printing has heretofore been distinguished as a color document. As a result, inadvertent color copying is performed, with consequent problems of increased costs and lowered productivity.

SUMMARY OF THE INVENTION

An object of the present invention is to solve the aforementioned problems.

A further object of the present invention is to distinguish color original documents suitable for monochrome copying.

A further object of the present invention is to prevent unneeded color copying.

A further object of the present invention is to process an original document with a color background as a monochrome image, in other words, to copy a color background as white.

These and other objects are attained by an image processing apparatus possessing:

- a signal-receiver which receives image data;
- a color discriminator which discriminates whether received image data are based on a color original document or a monochrome original document;
- a background discriminator which discriminates whether received image data are based on an original document whose image background area is color; and
- a processor which processes the aforementioned image data as based on a monochrome original document when a background area is distinguished as color by the background discriminator.

These and other objects are also attained by an image processing apparatus which discriminates based on original document image data whether an original document is a color original document or a monochrome original document, wherein the image processing apparatus comprises a processor which determines whether a background area alone within an original document image is colored, and an operational mode which discriminates an original document as a monochrome original document when it is determined that a background area alone is colored.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENT

Figure 1:
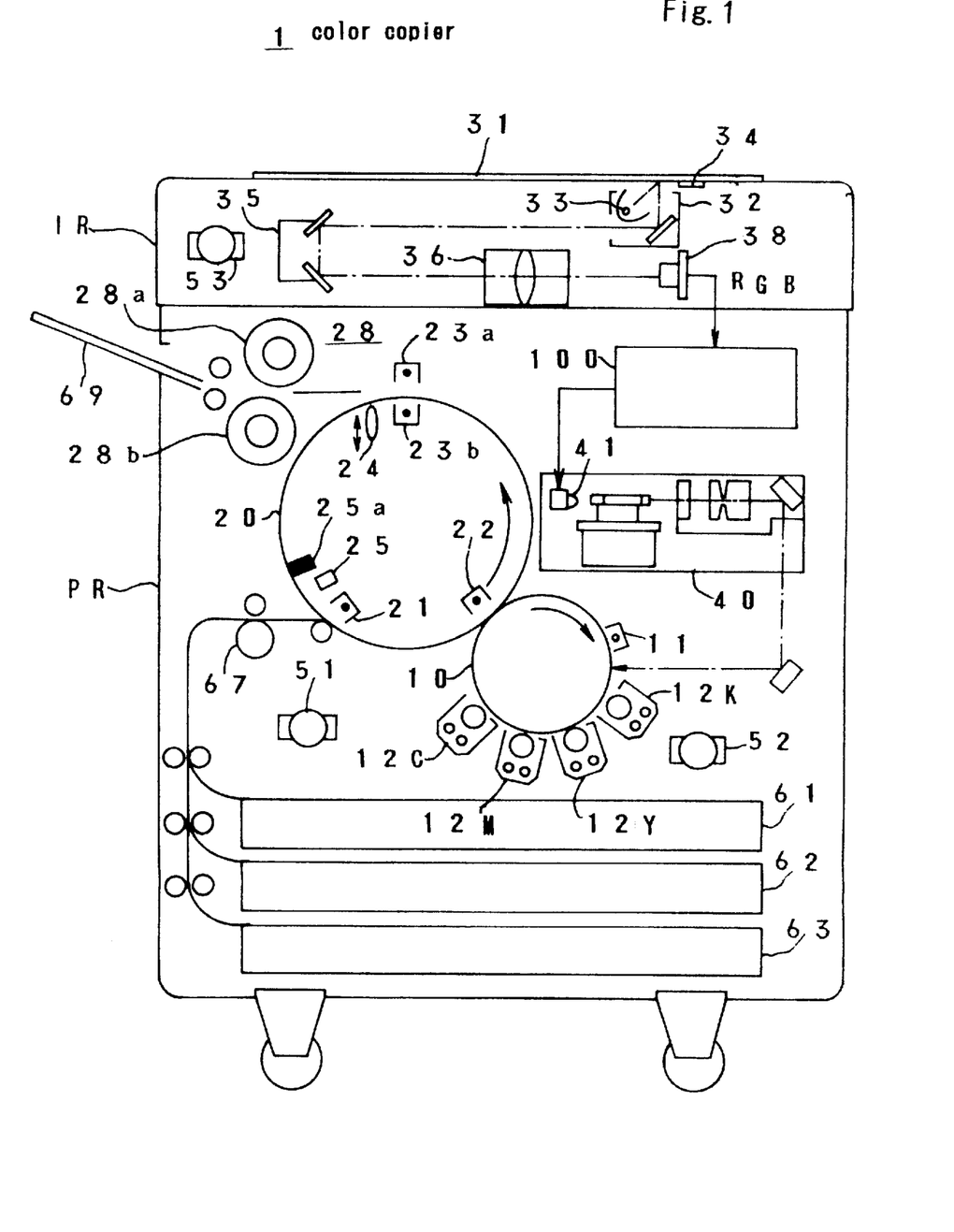
FIG. 1 is a schematic diagram of a color copier equipped with an image processing system pertaining to the present invention.

FIG. 1 is a schematic diagram of color copier 1 equipped with image processing system 100 pertaining to the present invention.

Color copier 1 is a digital copier capable of single color copying or full-color copying and comprising reduction-type line scanning image reader IR and electrophotographic-type printer unit PR.

In image reading by image reader IR, scanner 32 scans an original document placed on document table glass 31, and one-dimensional color image sensor 38 comprising a CCD (charge-coupled device) resolves an original image into the three colors of R (red), G (green), and B (blue). Resolution is 400 dpi.

A cover not illustrated or an ADF is attached to the upper surface of image reader IR. White sheet 34 used for shading correction is provided at the lower surface of document table glass 31. Scanner 32 incorporates exposure lamp 33 which illuminates an original document, and a mirror which directs light reflected by the original document to color image sensor 38. Light reflected by the mirror in scanner 32 is deflected by a pair of mirrors in mobile unit 35, passes through imaging lens 36, and strikes color image sensor 38. Mobile unit 35 moves at half the speed of scanner 32 in order to achieve a constant light path length. The drive source for the movement of scanner 32 and mobile unit 35 is scanner motor 53. Operational control of color image sensor 38 performs a main scan, and movement of scanner 32 performs a subscan. A control panel is provided on image reader IR whereby a user can issue various instructions to the control system, such as select/release ACS mode.

Printer unit PR is equipped with an image-production system and an ADF and forms a color copy image by means of four colored toners including the three primary colors (C, M, Y), for creating desired colors, and black (K), for enhancing the reproducibility of black color. The image-production system possesses beam scanning-type print head 40 employing semiconductor laser (LD) 41 as a light source, photosensitive drum 10 serving as a latent image carrier, electrostatic charger 11, cyan developer 12C, magenta developer 12M, yellow developer 12Y, black developer 12K, transfer drum 20, and fixing device 28. Photosensitive drum 10 and transfer drum 20 are rotated synchronously by main motor 51. Fixing device 28 is equipped with one pair of fixing rollers 28a and 28b. An intake and transport mechanism possesses three paper supply cassettes 61, 62, and 63, respectively capable of accommodating different size paper.

Photoelectric conversion signals for each color that are output from color image sensor 38 are quantized by image processing system 100, undergo various processing, and are then sent to print head 40 of printer unit PR in the form of exposure control data. In the present preferred embodiment, data for one component among C, M, Y, and K are sent to printer unit PR during a single document scan (sequential surface transfer format). For example, in the case of a monochrome original document, ACS processing discussed hereinafter selects a monochrome mode, and only K component data are sent to the printer unit. If an original document is red alone, MY mode is selected, and M component and Y component data are sent to printer unit PR sequentially. For a full color original document, full-color mode is selected, and data for individual C, M, Y, and K components are sent in turn.

In printer unit PR, a designated size paper is supplied from any of paper supply cassettes 61 through 63. The supplied paper is transported by a roller group including timing roller pair 67 and wound onto the circumferential surface of transfer drum 20 by electrostatic adhering charger 21. Individual processes of exposure (printing), developing, and transfer are carried out for each 40 color C, M, Y, and K. In full-color mode, superposition of the four colored toner images (overlay transfer) is carried out on transfer drum 20. A paper bearing a designated number of toner images transferred by transfer charger 22 is separated from transfer drum 20 by separation chargers 23a and 23b and by separation member 24 which moves in an up-down direction, and the paper is sent to fixing device 28. The fixed paper is ejected to paper ejection tray 69. Rotational position sensor 25 comprising a photointerrupter which outputs a timing signal for image production operations is disposed on the inner surface of transfer drum 20. Light baffle 25a which operates rotational position sensor 25 is attached to the inner surface of transfer drum 20. A timing signal is output at each single rotation of transfer drum 20, and this signal is used in timing regulation for coordinated operation of image reader IR and printer unit PR.

Figure 2:
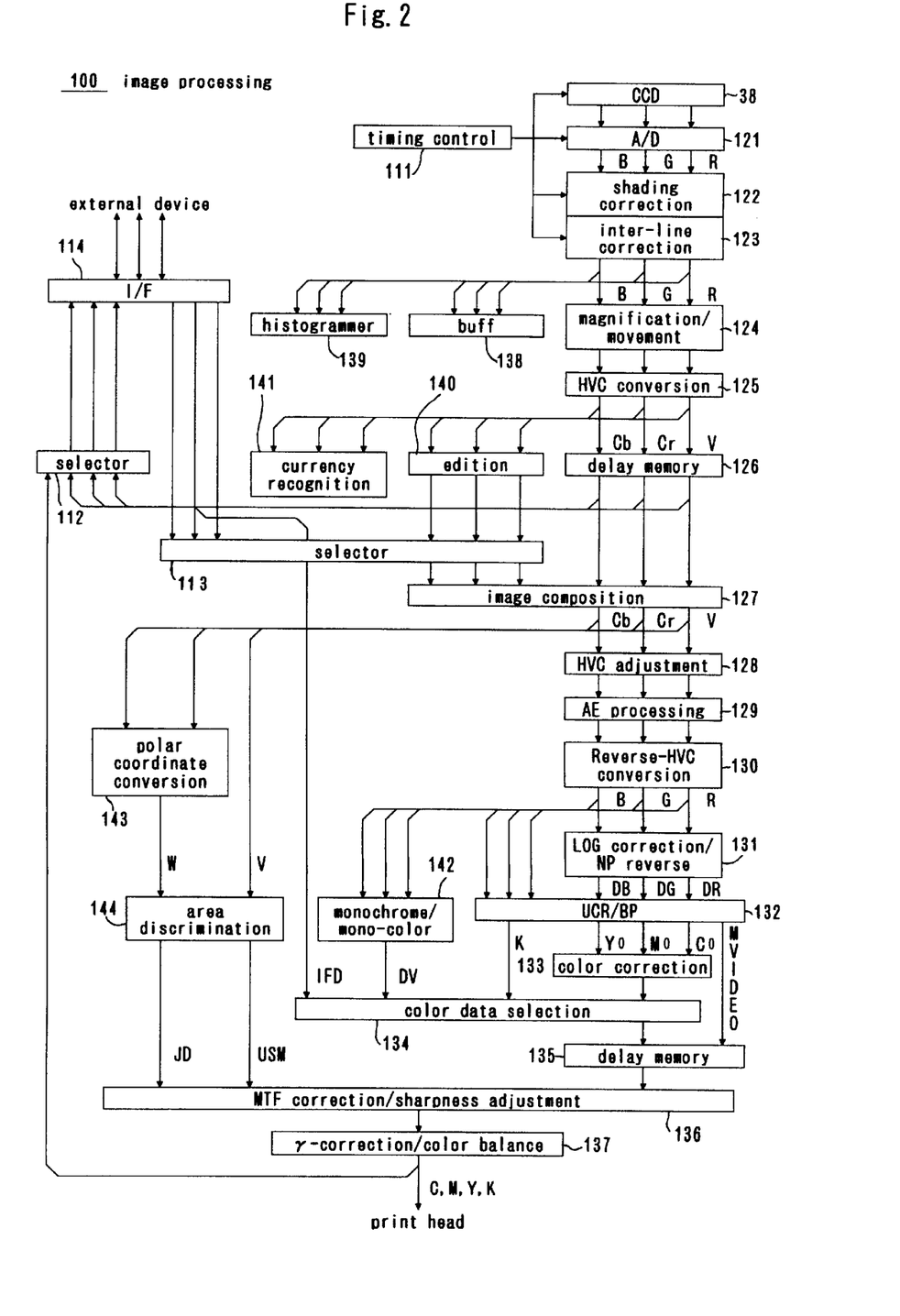
FIG. 2 is a complete schematic diagram of an image processing system.

FIG. 2 is a complete schematic diagram of image processing system 100.

A photoelectric conversion signal from color image sensor 38 is input to A/D converter 121. A/D converter 121 converts photoelectric conversion signals for individual R, G, B components into 8 bit (256 halftone) image data. Shading correction unit 122 compensates for variation between dots (pixels) in the main scan direction of individual R, G, B colors. Specifically, image data acquired when a white sheet is read prior to original document scanning are stored in an internal shading memory as standard data, and a calculation is performed wherein the reciprocal of the standard data are multiplied by original document image data. In order to coordinate the subscan position of individual CCD arrays for R, G, and B, inter-line correction unit 123 uses an internal field memory to perform line unit data delay suited to the scan speed (the variable magnification on the subscan side).

Magnification change/movement unit 124 possesses two line memories used to change magnification for each color. Any change to magnification or movement to occur in the main scan direction is carried out by control in which input and output are performed in turn for each line, and read timing and write timing therein is independent. In the course of this control, image loss or blurring is prevented by performing correction processing suited to a change in magnification, before writing in the case of reduction, and after reading in the case of enlargement. Magnification change/movement unit 124 also handles image repeat processing, enlarged copy processing, and mirror image processing.

Histogram generating unit (histogrammer) 139 generates a value signal from three-color image data following inter-line correction during original document prescanning, and histogram generating unit 139 generates a histogram representing value distribution data for the original document. The histogram obtained allows determination of control values pertaining to ACS processing, which discriminates color in an original document, and to AE processing, which prevents background fogging of an original document.

HVC conversion unit 125 temporarily converts R, G, B image data into value signals (V data) and coloring signals (Cr, Cb data). V, Cr, and Cb data are input to editing unit 140. Based on optional editor designations, editing unit 140 performs such editing tasks as color changes, and coloration by closed loop region detection.

Currency recognition unit 141 determines whether an original document is copy-prohibited material such as paper currency or a security certificate, and if the original document is copy-prohibited material, currency recognition unit 141 issues a copy-prohibited command to the image-production control system.

Interface 114 receives V, Cr, and Cb data, and based on this data, transfers image data to external devices. To correspond to color signal I/F for various image data formats, interface 114 converts V, Cr, and Cb data to R, G, B signals; general purpose color spacing X, Y, Z signals; and L*, a*, b* signals. Interface 114 also possesses a converse function to convert various image data transferred from external sources into V, Cr, Cb signals. Interface 114 also possesses a function to transfer, to external devices, C, M, Y, K data transferred to printer unit PR, and to receive C, M, Y, K data from external devices and transfer this to printer unit PR.

Image composition unit 127 selects V, Cr, and Cb data from interface 114 or editing unit 140 and performs image composition (insertion, character composition) together with image data from HVC conversion unit 125. Delay memory 126 is provided to coordinate composition timing. HVC adjustment unit 128 is provided to perform image adjustment suited to the human visual sense in terms of hue (H: tint), value (V: lightness), and chroma (C: brilliance), and H, V, and C can each be adjusted independently based on operating panel instructions.

AE processing unit 129 controls the background level in terms of value, based on information obtained by histogram generating unit 139 or panel operating information pertaining to output density. Reverse-HVC conversion unit 130 converts V, Cr, and Cb data to R, G, B data. LOG correction/NP reversal unit 131 converts R, G, B data (luminance data) to density data (DR, DG, DB). Monochrome data generating unit 142 generates value data from R, G, B data and generates halftone data (DV) used for monochrome reproduction.

UCR/BP processing unit 132 performs UCR/BP processing (undercolor removal/black printing) corresponding to original document chroma data, which is the difference between maximum values and minimum values for each of R, G, B (MAX(R, G, B)−MIN(R, G, B)), and to original document background color components, which are the minimum values for density data DR, DG, DB (MIN(DR, DG, DB)). The result is the generation of K data, and C0, M0, Y0, data corresponding to developing colors.

Color correction unit 133 performs color correction masking calculation to convert C, M, Y (C0, M0, Y0) data already subjected to UCR processing to C, M, Y data applicable to toner characteristics. Color data selection unit 134 outputs monochrome DV data when monochrome mode has been designated either by a panel operation or by ACS distinction. In full-color mode, color data selection unit 134 outputs masking calculation data (C, M, Y data) or BP processing data (K data) according to a reproduction process signal (CODE 1,0).

Area discriminating unit 144 discriminates among black characters and halftone dot, etc. based on minimum values of R, G, B data (MIN(R, G, B)) and the difference between maximum values and minimum values of R, G, B data (MAX(R, G, B)−MIN(R, G, B)). The result is the output of JD signals and USM signals. To balance image graininess and the reproduction characteristics of image character regions, a LIMOS signal is output to change the image reproduction period in printer unit PR.

MTF correction unit 136 optimizes output image quality by performing edge enhancement, color bleeding correction, or smoothing, etc. of input C, M, Y, and K data, according to a JD signal or a USM signal. Color balance adjustment unit 137 adjusts γ curves or C, M, Y, K color balance according to a density level input operationally.

Figure 3:
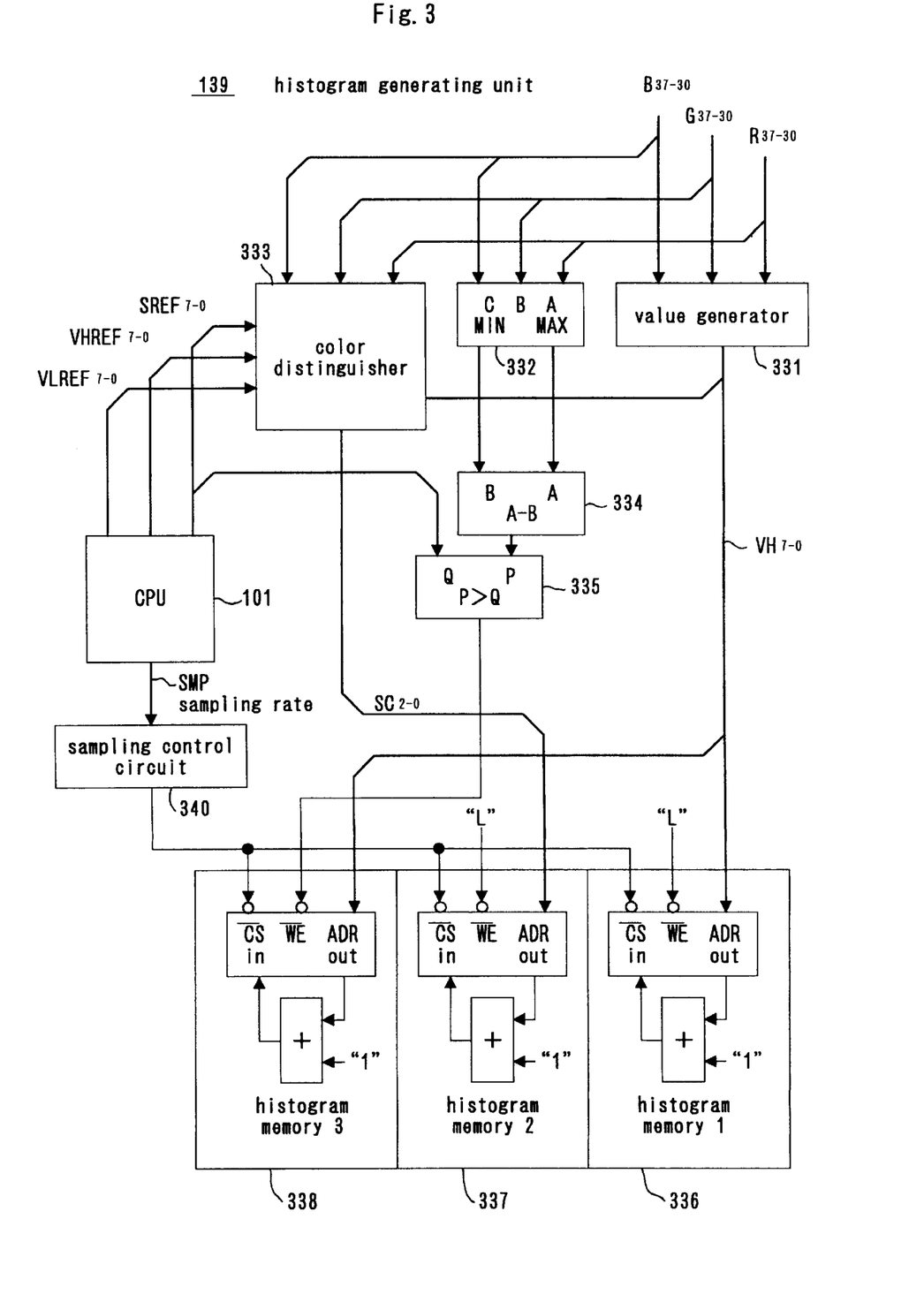
FIG. 3 is a block diagram of a histogram generating unit.
Figure 4:
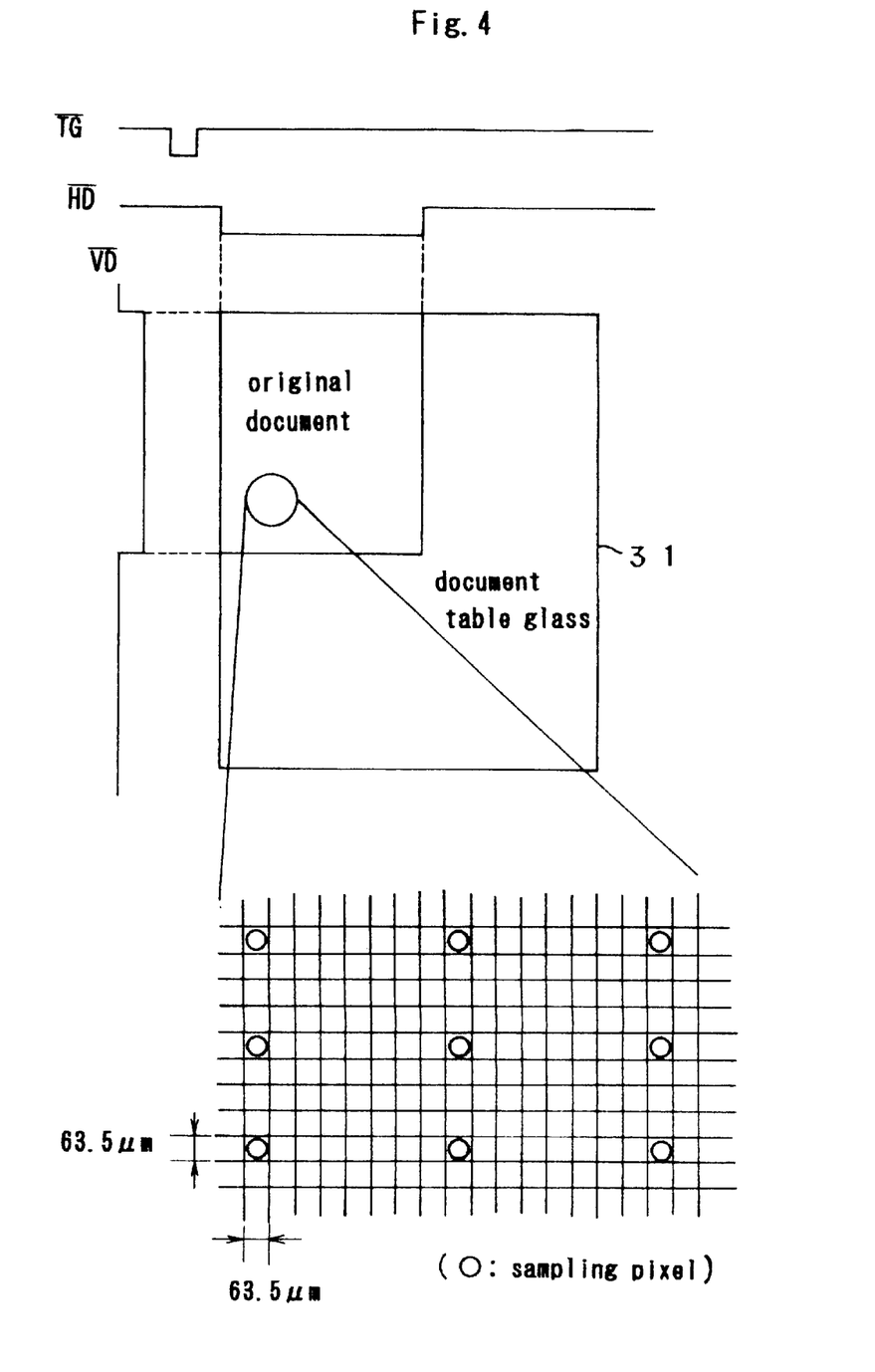
FIG. 4 is a sampling pattern diagram.

FIG. 3 is a block diagram of histogram generating unit 139, and FIG. 4 is a sampling pattern diagram.

Histogram generating unit 139 possesses value generator 331, min/max detector 332, color distinguisher 333, subtracter 334, comparator 335, first through third histogram memories 336, 337, and 338, and sampling control circuit 340.

Data R37-30, G37-30, and B37-30, which is R, G, B data adjusted for position by inter-line correction unit 123 during prescanning, is input to value generator 331, min/max detector 332, and color distinguisher 333. Value generator 331 generates value data VH7-0 from R37-30, G37-30 and B37-30 data and outputs this to first histogram memory 336 as an address. When the address is input, first histogram memory 336 reads histogram data within the address, adds 1, and writes this into the same address. In other words, a memory operation consists of a single period comprising a read-modify-write cycle in which, for 8 dots, an address describes the gradation level, and data expresses the distribution (frequencies) of gradation levels. The reason that the object of histogram generation is value data VH7-0 and not R, G, B data R37-30, G37-30, and B37-30 is that AE processing performs correction on data segmented by value and coloring signals. Details are described hereinafter.

Sampling control circuit 340 determines the data intake interval (sampling rate) in a histogram memory based on sampling interval value SMP produced by CPU 101, which is responsible for overall control of image processing system 100. This is because a 32 Mbit memory capacity would be required to generate a histogram for all dots in the maximum original document size (A3). Dots are therefore sampled as appropriate (main scan ⅛, subscan ¼), and the amount of data is reduced to 1 Mbit. Prior to prescanning, a sensor (not illustrated) detects the original document size. Enabling signals HD and VD which indicate the original document area in the main scan direction and the subscan direction, respectively, are consequently input to sampling control circuit 340. Sampling is then performed only within these original document areas. Main scan period enabling signal TG has a one-line period. Signal VCLK is an image data synchronization clock.

Second histogram memory 337 is provided for ACS processing. While first histogram memory 336 simply provides a value histogram for an original document, in second histogram memory 337, addresses are designated by color discriminating data SC2-0 provided by color distinguisher 333, and a histogram is provided for dots in an original document that are non-colored; colored either R, G, B, C, M, or Y; or colored other than R, G, B, C, M, or Y. Based on data R37-30, G37-30, and B37-30 from inter-line correction unit 123; value data VH7-0 from value generator 331; and threshold values SREF7-0, VHREF7-0, and VLREF7-0 from CPU 101, color distinguisher 333 discriminates whether a dot of interest is a non-colored dot; a dot colored any of R, G, B, C, M, or Y; or a dot colored otherwise. Third histogram memory 338 is furnished to provide a value-segmented histogram for colored dots. Min/max detector 332 determines the largest color value (MAX(R, G, B)) and the smallest color value (MIN(R, G, B)) among data R37-30, G37-30, and B37-30, and subtracter 334 calculates the difference between these values. When this calculated result is larger than threshold value SREF7-0, the dot of interest can be deemed colored. In this instance, comparator 335 output is activated, and writing to third histogram memory 338 is allowed.

Prior to the start of prescanning, CPU 101 performs memory initialization by writing "00000B" into all addresses in histogram memories 336 through 338. When prescanning is complete, frequency data for each gradient are read from first histogram memory 336, frequency data for each color are read from second histogram memory 337, and frequency data for the coloration of each gradient are read from third histogram memory 338.

Figure 5:
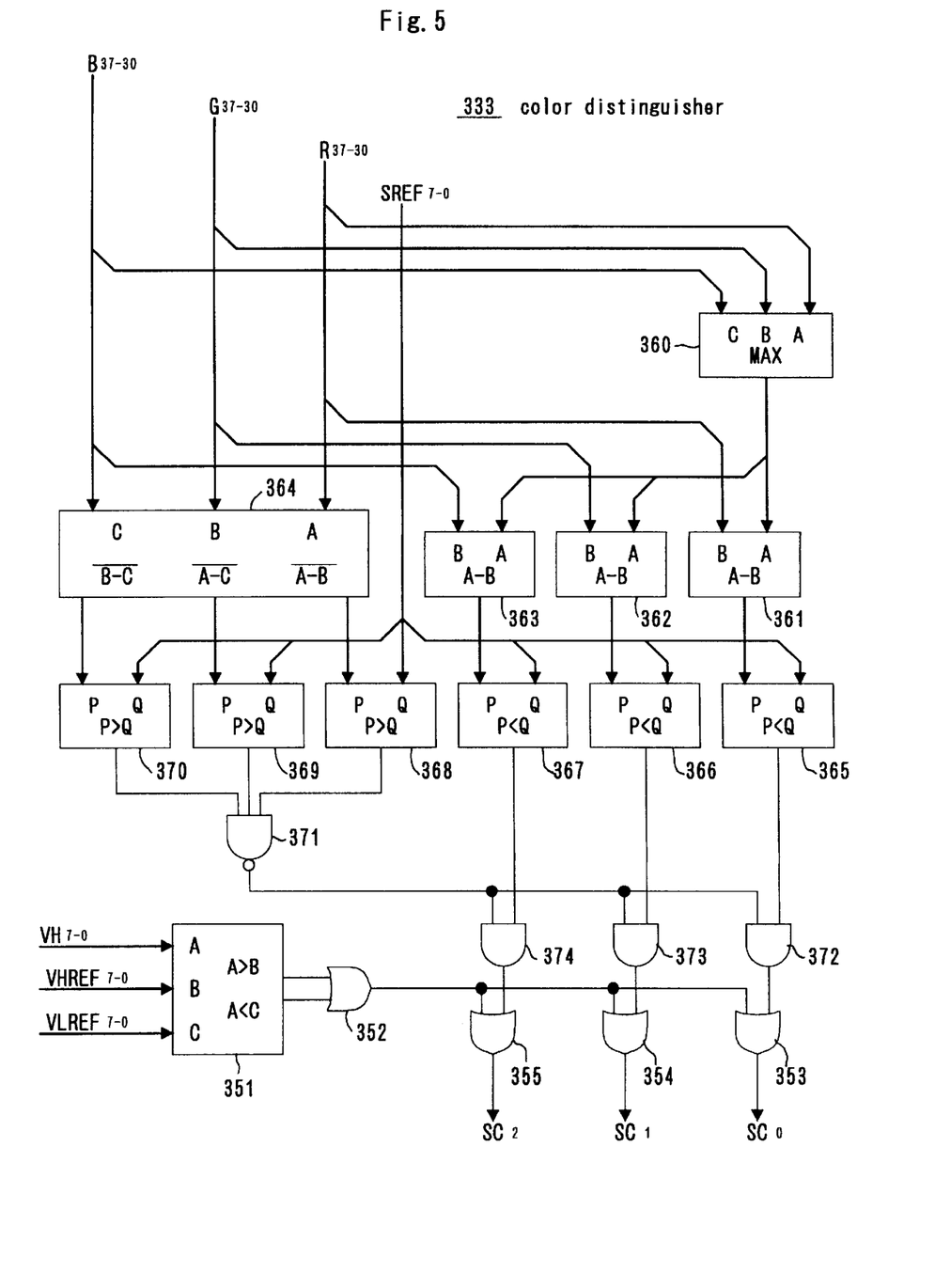
FIG. 5 is a circuit diagram of a color distinguisher.

FIG. 5 is a circuit diagram of color distinguisher 333.

Even a colored dot will appear white if too bright and black if too dark. Thus, comparator 351 and OR circuits 352 through 355 first determine whether brightness is within a range appearing as colored. The output of OR circuits 353 through 355 corresponds to individual bits of color discriminating data SC2-0. If value data VH7-0 is larger than the upper threshold value VHREF7-0 or smaller than the lower threshold value VLREF7-0, color discriminating data SC2-0 becomes "7(111B)", indicating non-color.

If value data VH7-0 is between threshold value VHREF7-0 and threshold value VLREF7-0, then the output of color discriminating data SC2-0 corresponds to relative relationships with three-color data R37-30, G37-30, and B37-30. Specifically, if the differences between R and G, R and B, and G and B are all larger than threshold value SREF7-0, then color discriminating data SC2-0 becomes "0", indicating coloring other than the six colors R, G, B, C, M, Y. If the difference between any pair among R and G, R and B, and G and B is smaller than threshold value SREF7-0, then a dot can be distinguished as being either non-colored or colored R, G, B, C, M, or Y. Here, if the difference between individual R, G, B color data and the maximum values of three-color data R37-30, G37-30, and B37-30 is smaller than threshold value SREF7-0, than the dot color is a color comprising those color component(s). For example, if only R is below the threshold value, the output of color discriminating data SC2-0 indicates R (1); if R and G are below the threshold value, the output of color discriminating data SC2-0 indicates Y (3), and if all components are below the threshold value, the output of color discriminating data SC2-0 indicates non-coloring (7). The relationships between colors and the values of color discriminating data SC2-0 are as shown in table 1.

TABLE 1

| Value of color discriminating data SC2-0 | Color distinction |
|---|---|
| 0 | Color other than R, G, B, C, M, Y |
| 1 | R (Red) |
| 2 | G (Green) |
| 3 | Y (Yellow) |
| 4 | B (Blue) |
| 5 | M (Magenta) |
| 6 | C (Cyan) |
| 7 | No color |

Figure 6:
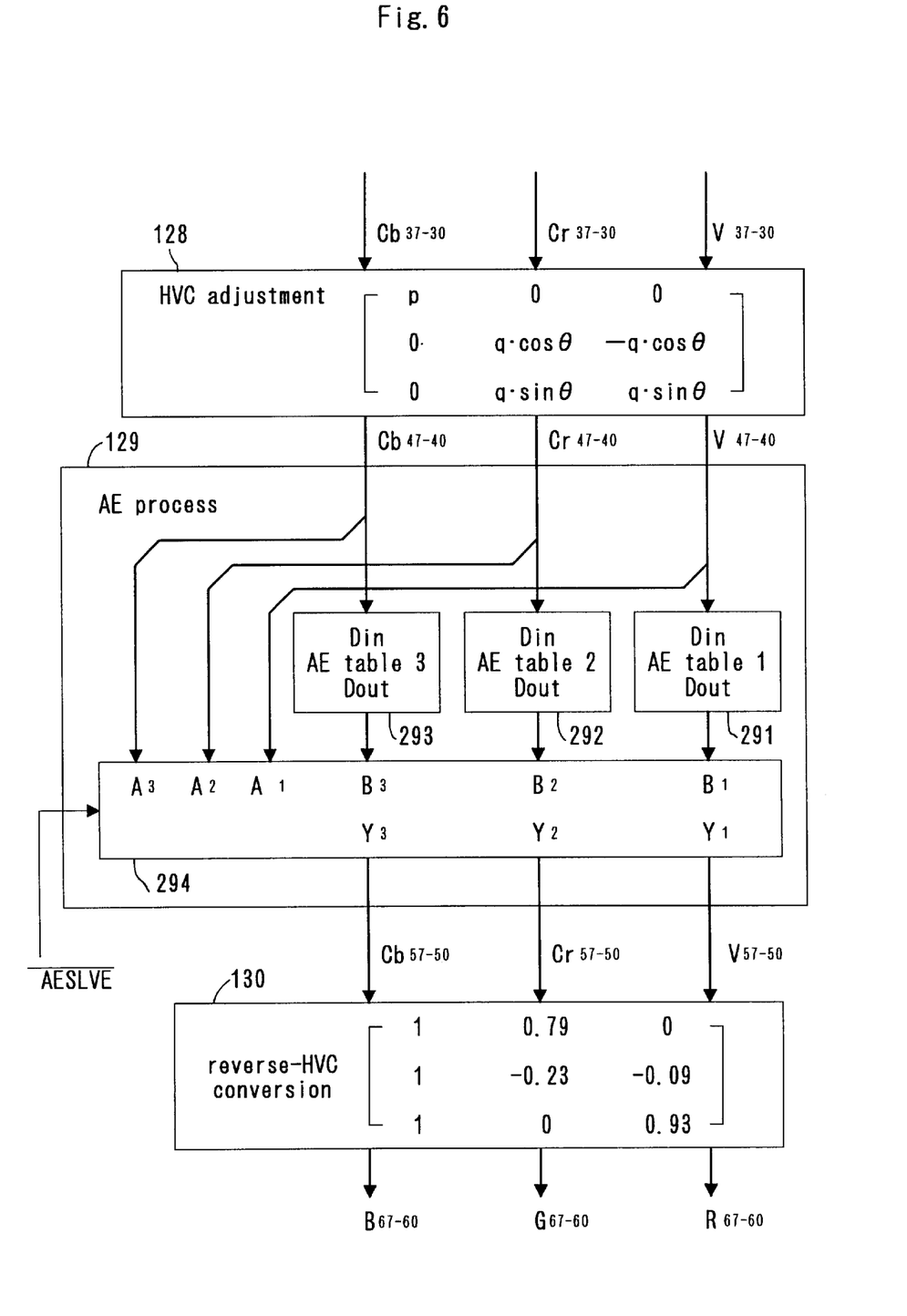
FIG. 6 is a block diagram of an AE processing unit.
Figure 7:
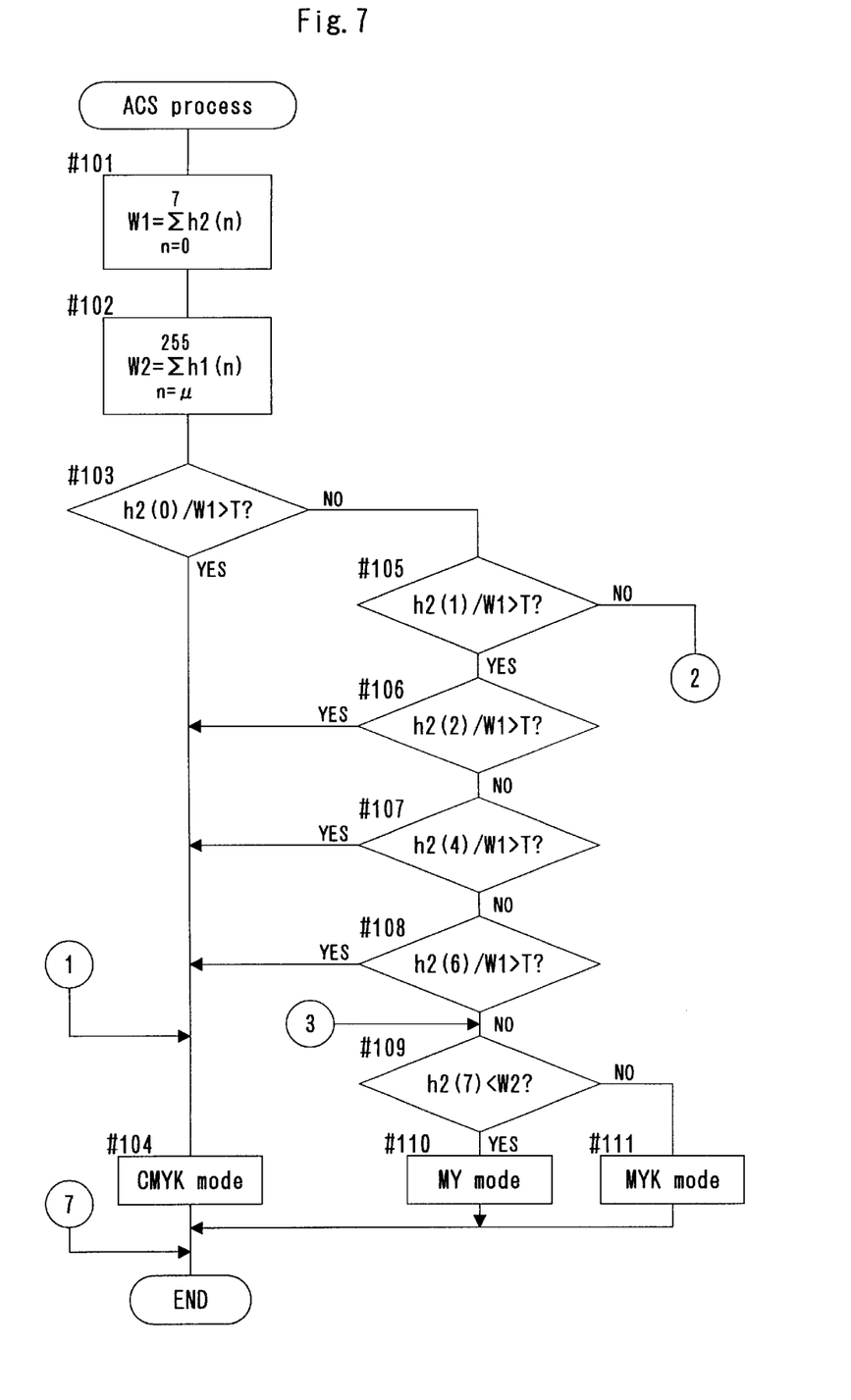
FIG. 7 is a flowchart of ACS processing executed by a CPU.
Figure 8:
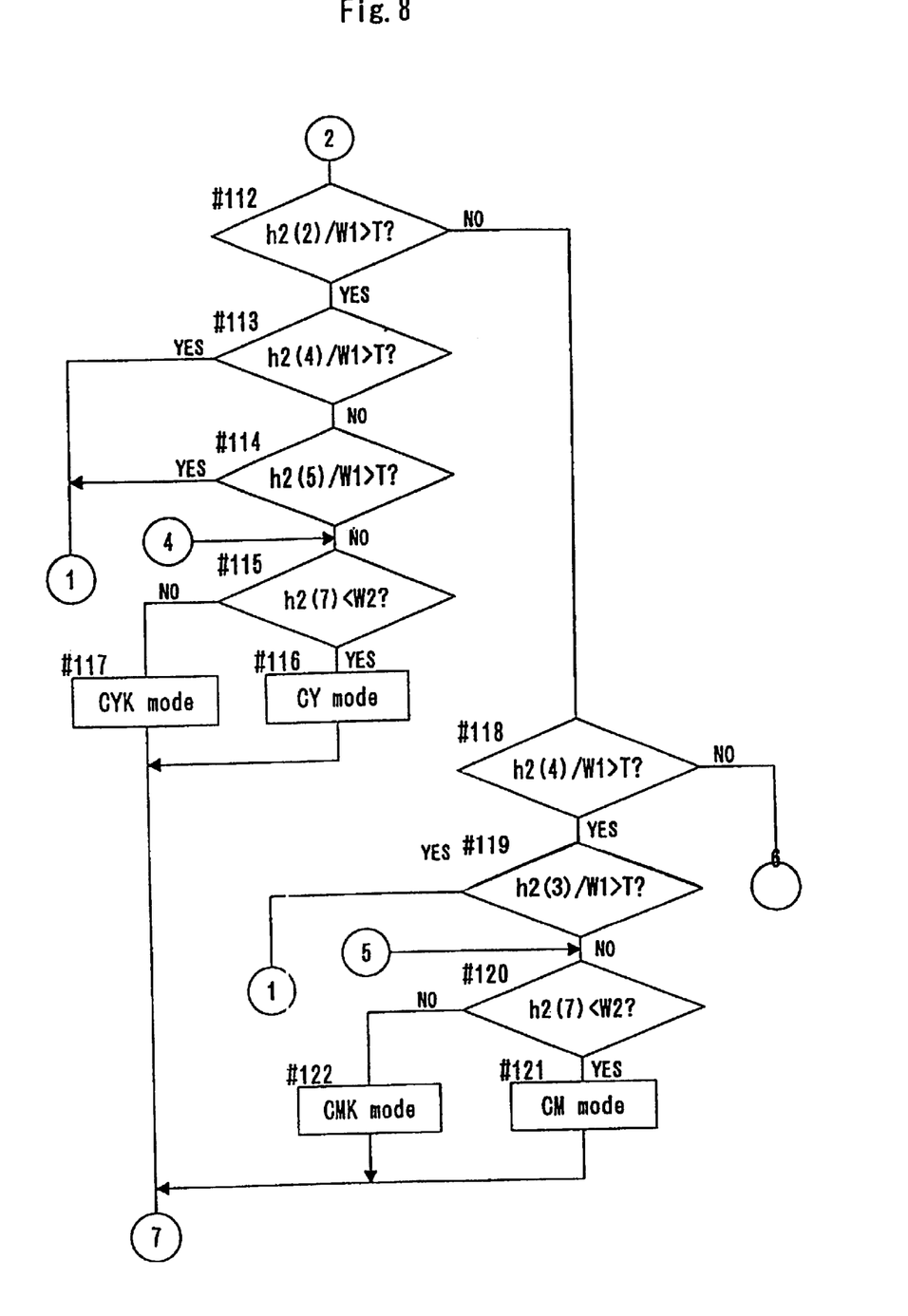
FIG. 8 is a flowchart of ACS processing executed by a CPU.
Figure 9:
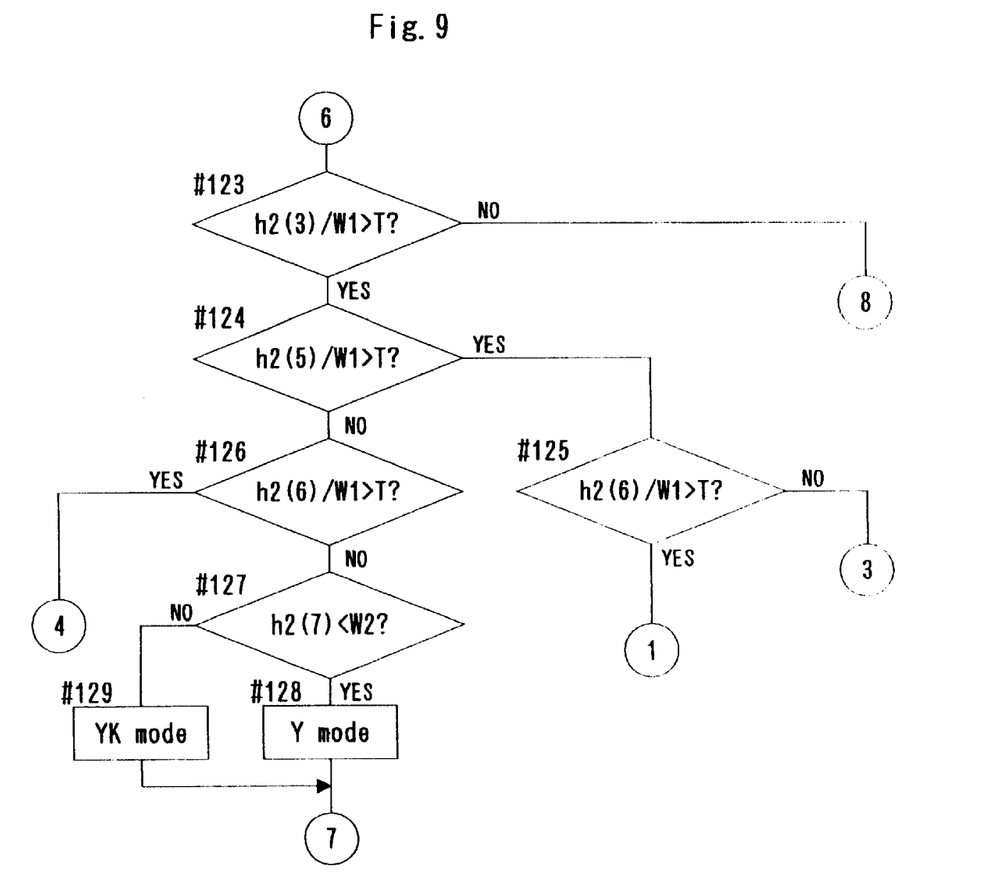
FIG. 9 is a flowchart of ACS processing executed by a CPU.
Figure 10:
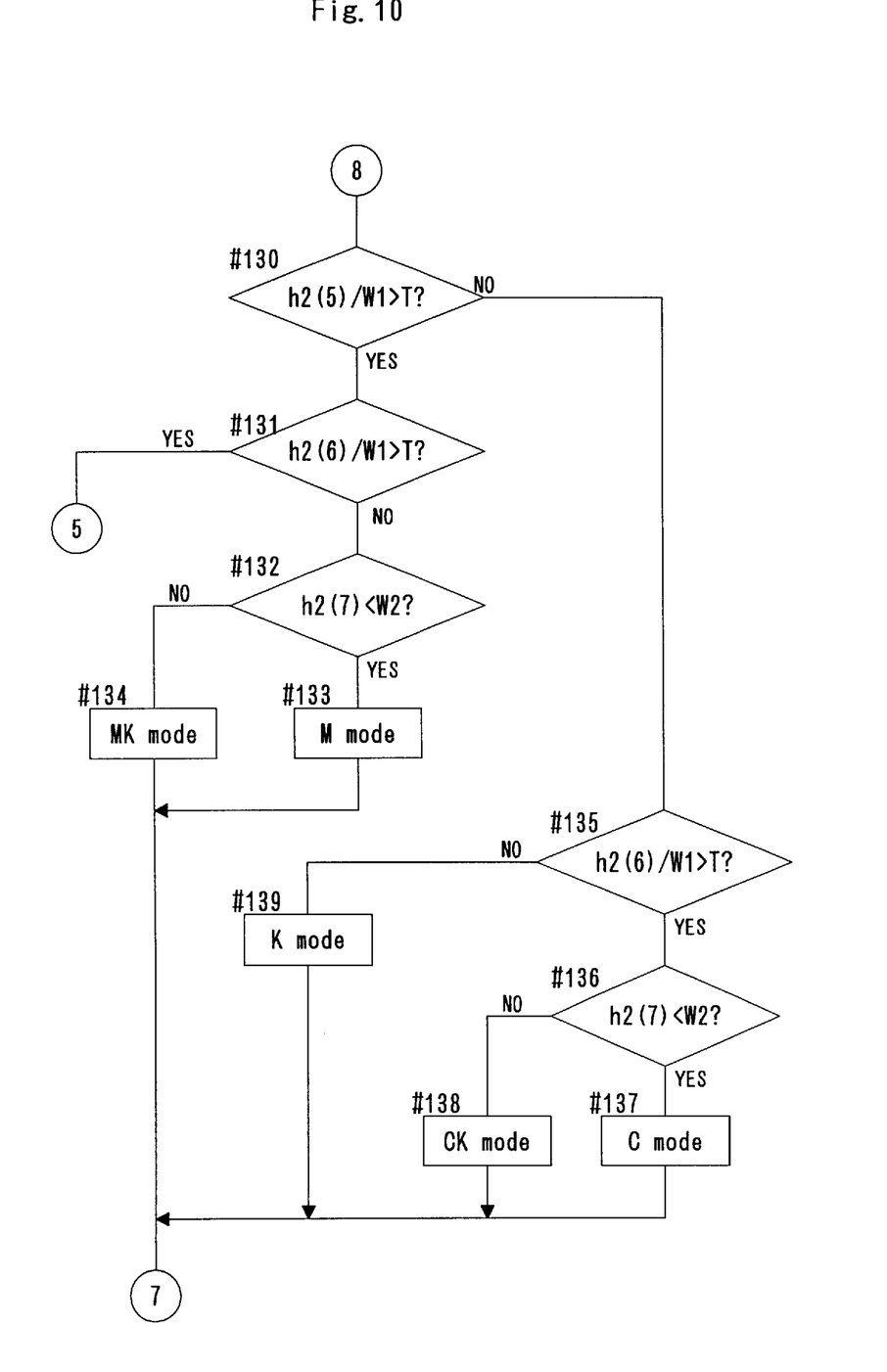
FIG. 10 is a flowchart of ACS processing executed by a CPU.

FIG. 6 is a block diagram of AE processing unit 129.

AE processing unit 129 comprises three lookup tables 291, 292, and 293, and selector 294 which serves to output correction data or through data. AE processing unit 129 performs value correction based on the following formula and an AE level discussed hereinafter.

$$V_{out} = (256/AE \text{ level}) \times V_{in}$$

Coloring signal component data Cr and Cb are output as trough data (without modification). Only variable density component data (V) is subject to control. This allows automatic adjustment of a background level to be completed without changing color information in a color original document.

In image processing system 100 structured as described above, CPU 101 determines the content of an ACS operation and an AE operation based on histogram data obtained through a prescanning operation.

[ACS Processing]

This processing determines the toner colors used in reproduction of an original document image. For a monochrome original document; a single-color original document including any one of C, M, Y, R, G, B; or a two-color original document to including black and any one of C, M, Y, R, G, B, this processing increases copy speed compared to full-color reproduction using four colored toners. An appropriate copy is also obtained rapidly during ADF use in which various types of original documents are placed together in no particular order, even if a user is unaware of this situation. In the case of a monochrome original document, for example, only a single reproduction process (developing) is required.

FIG. 7 through FIG. 10 are flowcharts of ACS processing executed by CPU 101. Determination is first made for overall frequency W1 pertaining to second histogram memory 337, and for high value area frequency W2 pertaining to first histogram memory 336 (#101, #102). Here, frequency W1 indicates the total number of dots in an original document image, and frequency W2 indicates the number of dots in the background (white area) within an original document. Frequency $h2(0)$ of colors other than R, G, B, C, M, Y is next ascertained from second histogram memory 337, and its proportion with respect to total number of dots W1 is determined. If this calculated result is larger than threshold value T (YES at #103), the original document includes all color components C, M, Y, and a CMYK four-color reproduction process (CMYK mode) is therefore established (#104).

If $h2(0)/W1$ is conversely less than threshold value T, frequencies $h2(1)$, $h2(2)$, $h2(3)$, $h2(4)$, $h2(5)$, and $h2(6)$ for individual colors R, G, Y, B, M, and C are investigated together with the magnitude of their ratio relative to total number of dots W1 (relationship to threshold value T), and an image-generating mode corresponding to the results is established.

If R (MY) and G (CY) component proportions are large (YES at #105 and #106), CMYK mode is established. CMYK mode is also established if R and B component proportions are large (YES at #107), or if R and C component proportions are large, (YES at #108). If the number of non-colored dots $h2(7)$ is smaller than the number of background (white area) dots W2, or if only the R component is large (YES at #109), MY mode which performs M, Y reproduction is established (#110). If R component and non-colored component proportions are large (NO at #109), MYK mode which performs M, Y, K reproduction is established (#111).

If an R component is determined to be not present at step #105, processing proceeds to step #112 and investigates the G component proportion. If G component and B (CM) component proportions are large (YES at #112 and #113), CMYK mode is established. If G component and M component proportions are large, (YES at #114), CMYK mode is established. If only the G component proportion is large to (YES at #115), CY mode which performs C, Y reproduction is established (#116). If G component and non-colored component proportions are large (NO at #115), CYK mode which performs C, Y, K reproduction is established (#117).

If a G component is determined to be not present at step #112, processing proceeds to step #118 and investigates the B component proportion. If B component and Y component proportions are large (YES at #118 and #119), CMYK mode is established. If only the B component proportion is large (YES at #120), CM mode which performs C, M reproduction is established (#121). If B component and non-colored component proportions are large (NO at #120), CMK mode which performs C, M, K reproduction is established (#122).

If a B component is determined to be not present at step #118, processing proceeds to step #123 and investigates the Y component proportion. If Y component and M component proportions are large (YES at #123 and #124), the C component proportion is checked (#125). If the C component proportion is small, processing returns to #109, and either MY mode or MYK mode is established according to the non-colored component proportion. If Y component and C component proportions are large (YES at #126), processing returns to #115, and either CY mode or CYK mode is established according to the non-colored component proportion. If only the Y component proportion is large (YES at #127), Y mode which performs Y reproduction is established (#128). If Y component and non-colored component proportions are large (NO at #127), YK mode which performs Y, K reproduction is established (#129).

If a Y component is determined not to be present at step #123, processing proceeds to step #130 and investigates the M component proportion. If M component and C component proportions are large (YES at #130 and #131), processing returns to #120, and either CM mode or CMK mode is established according to the non-colored component proportion. If only the M component proportion is large (YES at #132), M mode which performs M reproduction is established (#133). If M component and non-colored component proportions are large (NO at #132), MK mode which performs M, K reproduction is established (#134).

If an M component is determined to be not present at step #130, processing proceeds to step #135 and investigates the C component proportion. If only the C component proportion is large (YES at step #135 and step #136), C mode which performs C reproduction is established (#137). If C component and non-colored component proportions are large (NO at #136), CK mode which performs C, K reproduction is established (#138). If a C component is determined to be not present at step #135, K mode which performs K reproduction is established (#139).

[AE Processing]

Value generator 331 in histogram generating unit 139 calculates value data VH7-0 through suitable application of the following equation to RGB data R37-30, G37-30, and B37-30, respectively.

$$VH=0.33203125\times(R37\text{-}30)+0.59765625\times(G37\text{-}30)+0.07031250\times(B37\text{-}30)$$

Value data VH7-0 determined by this equation approaches the relative luminosity factor (brightness) apparent to humans.

In a conventional color copier, AE processing is performed only in monochrome mode in order to obviate differences in color balance from the original document. Meanwhile, black character discrimination and similar processing has been introduced even in full-color mode in order to achieve clear reproduction of a mixed monochrome/color original document and to prevent offsetting, and a need has arisen for automatic optimized control of AE processing and other such original document background level processing.

Image processing system 100 pertaining to the present preferred embodiment performs AE processing which automatically optimizes an original document background level without altering original document tinting and without regard to intermingled monochrome and color areas. At such time, R, G, B image signals are temporarily converted to V, Cr, Cb signals. AE processing performed on such V data and reconversion to R, G, B signals provides non-specialized processing content that does not distinguish between full-color mode and monochrome mode. Additionally, since no processing whatsoever is applied to color component signals Cr and Cb in full-color mode, AE processing produces no alteration of color balance.

In AE processing, the content of corrections is determined through the following procedures.

(A) Original Document Judged an Ordinary Monochrome Document or a Monochrome with Color Background Document (1) In the range V=255–136, value histogram frequencies h1(V) according to first histogram memory 336 are investigated in turn starting from the maximum value, and extreme value candidates are extracted. If a resulting frequency total comprising a maximum±8 is greater than 12.5%, processing according the following (2) is performed in which AE level=maximum gradient level. If there is no maximum, processing concludes with AE level=constant (e.g., 240). The value frequency at the maximum is also taken as Vmax.

(2) In the range V=AE level through (AE level)-(ID=0.08), if there is a minimum for value histogram (h1(V)), the relationship AE level=minimum is adopted. Alternatively, the AE level is taken as a value level at which the value histogram (h1(V)) frequency is less than $\frac{1}{16}$ Vmax.

(3) If the cumulative value of the value histogram for V=0–19 is less than $\frac{1}{16}$ that for the entire original document, the original document is judged to have faint characters, and a γ characteristic is set using a monochrome LOG table. This renders the background white while darkening pencil writing or other faint characters to provide good legibility.

(B) Original Document Judged a Color Document (1) In the range V=255–136, value histogram frequencies h1(V) are investigated in turn starting from the maximum value, and extreme value candidates are extracted. If a resulting frequency total comprising a maximum±8 is greater than 12.5%, processing according to the following (2) is performed in which maximum gradient level=AE level. If there is no maximum, processing concludes with AE level=constant (e.g. 240). The value frequency at the maximum is also taken as Vmax.

(2) In the range V=AE level through 255, if there is a maximum in the color histogram with a color frequency greater than Vmax/8, the AE level is assigned a value level in which the V=(255 through AE level) cumulative color dot value comprises $\frac{1}{16}$, and processing ends. If there is no maximum, processing pertaining to (3) is performed.

(3) In the range V=AE level through AE level-(ID=0.08), an assessment is made as to whether the following conditions are satisfied, and the AE level is revised.

(a) If there is a maximum for color dot histogram (h3(V)), the AE level is set at a value level in which the V=(255 through color maximum) cumulative color frequency value comprises $\frac{1}{16}$.

(b) If there is a minimum for value histogram (h1(V)), the relationship AE level=minimum is adopted.

(c) The AE level is made a value level in which the frequency of value histogram (H1(V)) comprises less than $\frac{1}{16}$ of Vmax.

(d) The AE level is made the value level where color histogram frequency h3(V) exceeds H1(V)/2.

AE processing is performed on a detected AE level using the following correction equation.

$$V_{out}\text{ (after}_{AE\ processing}\text{)}=(256/AE\text{ level})\times V_{in}\text{ (before AE processing)}$$

Figure 11A:
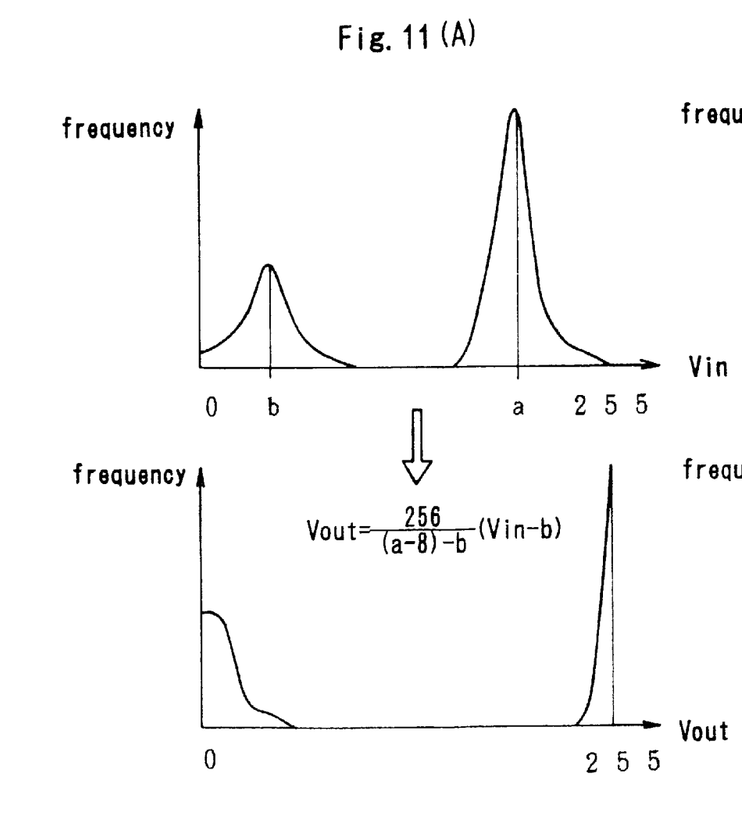
FIGS. 11(A) and 11(B) are a drawing describing AE processing in brief.
Figure 11B:
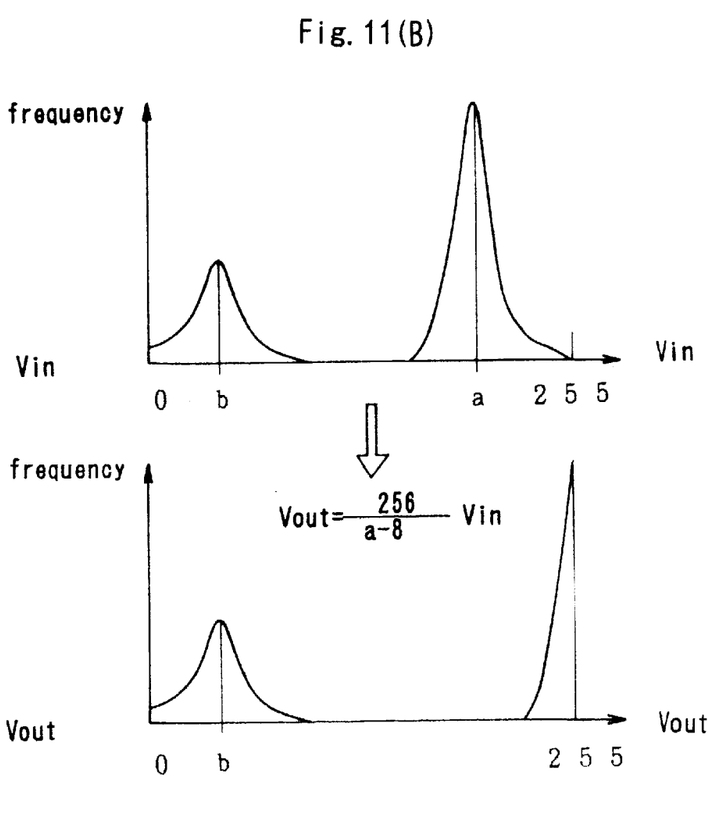

FIGS. 11(A) and (B) are drawings describing AE processing in brief. FIG. 11(A) illustrates a value distribution before and after AE processing in a monochrome original document with a color background or a normal monochrome original document. FIG. 11(B) illustrates a value distribution before and after AE processing in a color original document.

The aforementioned AE processing unit 129 is responsible for the value correction (background level adjustment) in FIGS. 11 (A) and (B). Because no correction is performed with respect to coloring signal components (Cr, Cb), color balance is not broken down.

ACS Processing for Background Color Removal

ACS processing for background color removal is performed on an original document in which a monochrome image is printed on a color background, or another such document judged a monochrome original document. In ACS processing for background color removal, a white area is substituted for an original document background, while an image is produced using only a K reproduction process. The productivity of a copy operation is consequently improved, while copy costs are reduced. When an original document image is judged a monochrome original document with a color background, K mode is selected as a copy mode. A monochrome copy of good quality and free from background fogging is then obtained by the provision of AE processing akin to the above-described monochrome original document processing.

Figure 12:
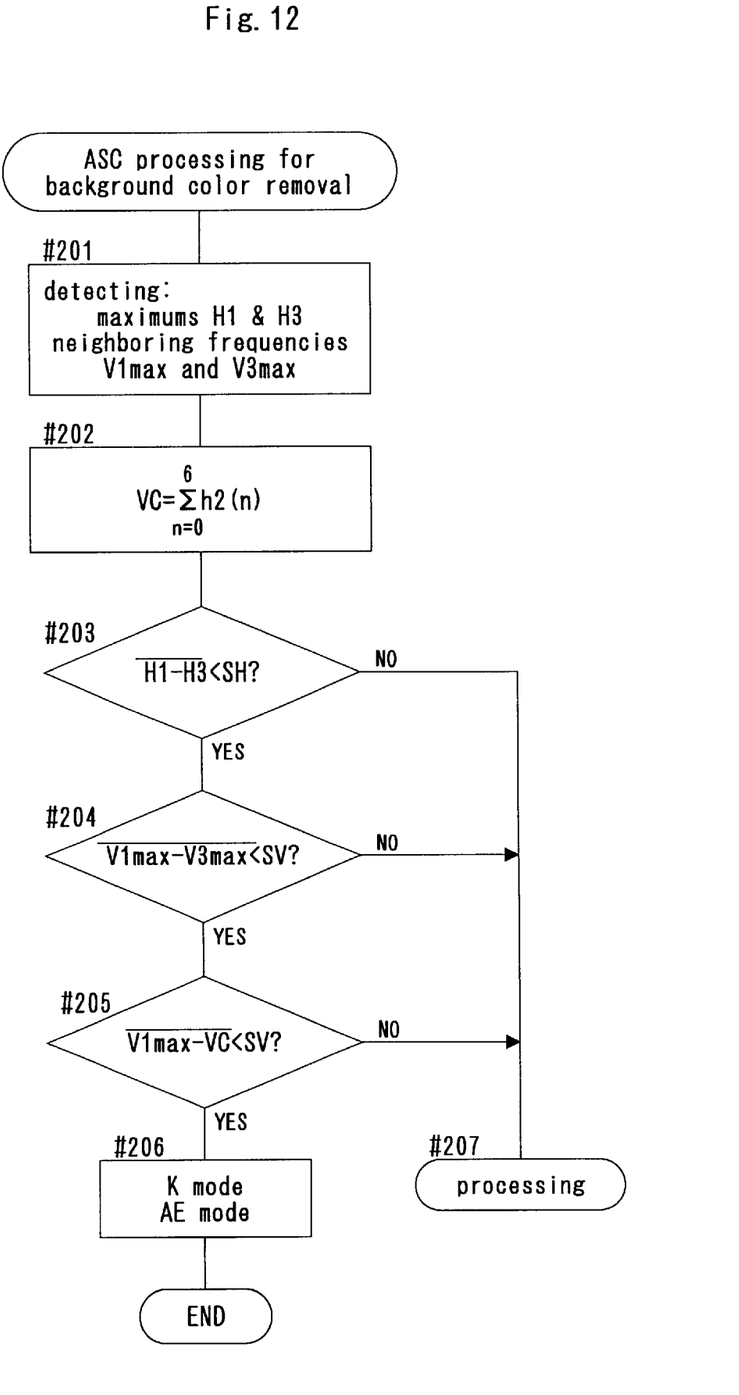
FIG. 12 is a flowchart of ACS processing for background color removal.

FIG. 12 is a flowchart of ACS processing for background color removal. This flowchart determines whether color data extracted from an original document is present only in a background area. This determination is performed through a comparison of the form of a histogram illustrating an extracted value distribution for an entire original document, and that of a histogram illustrating a color-only value distribution.

Extraction is first performed of maximums H1 and H3 from the bright side (V=255 through 136) of histogram H1(V) illustrating the entire value distribution for an original document image, and histogram h3(V) illustrating a value distribution for colored pixels alone. For each maximum, the neighboring frequencies V1max and V3max are then determined (#201). This allows extraction of frequencies on the high value side that neighbor the most frequently expressed value levels. Summation VC for color frequency in color-separated histogram h2(V) is then determined (#202). Respective background characteristics determined through the foregoing processing are then compared to determine whether color data are present in a background area alone. In essence, if the histogram forms agree closely, color data are judged to be present in a background area alone.

In the actual procedures, maximums are first compared. A determination is made as to whether the difference between maximum H1 and maximum H3 determined through the foregoing processing is lower than threshold value SH (#203). A determination is next made as to whether the difference between frequency V1max and frequency V3max is less than threshold value SV (#204). Finally, a determination is made as to whether the difference between frequency V1max and summation VC is less than threshold value SV (#205). If the result in all three steps is YES, nearly all of the colored pixels are found to be concentrated near maximum H1. Color is thereby determined to be present only in a background area of the original document. In other words, it is determined that the original document background is color, and that the original document contains no color components outside of the background.

If such a determination is made, monochrome mode and AE processing for a monochrome original document are established (#206). If, in contrast, any single condition in steps #203 through #205 is not satisfied, the document is not a monochrome original document with a color background, and the above-described routine ACS processing is executed (#207).

What is claimed is:

1. An image processing apparatus, comprising:
 a receiving device receiving image data including main image data and background image data;
 a discriminating device determining whether the received image data are based on an image comprising a monochrome main image and a color background image; and
 a processing device performing a first procedure on the received image data when the received image data is determined to be based on the image comprising a monochrome main image and a color background image and performing a second procedure on the received image data when the received image data is not determined to be based on the image comprising a monochrome main image and a color background image.

2. An image processing apparatus according to claim 1, wherein said discriminating device comprises a first detecting device detecting a first value distribution based on the entire received image data and a second detecting device detecting a second value distribution based on data of a color portion of the received image data, the first detecting device and the second detecting device cooperating to determine whether the received image data are based on the image comprising a monochrome main image and a color background image.

3. An image processing apparatus according to claim 2, wherein said first detecting device detects the first value distribution based on sampled image data from the entire received image data.

4. An image processing apparatus according to claim 3, wherein said second detecting device detects the second value distribution based on sampled image data from the data of a color portion of the received image data.

5. An image processing apparatus according to claim 1, wherein said first procedure comprises outputting the entire image data as a monochrome image.

6. The image processing apparatus of claim 1, further comprising a histogram generating device generating control values based on a value distribution of the received image data and a histogram reflecting the value distribution of the received image data.

7. The image processing apparatus according to claim 1, wherein the first procedure comprises outputting the entire image data as a monochrome image and the second procedure comprises an auto color selection procedure.

8. The image processing apparatus according to claim 7, wherein the first procedure further comprises outputting the image data making the background area white.

9. An image processing method, comprising:
 receiving image data of an original document;
 determining whether the original document is a color document or a monochrome document based on the image data;
 extracting a background area from the original document;
 determining whether the background area is color and a main area that is not the background area is monochrome; and
 performing a first procedure on the received image data when the background area is determined to be color and the main area is determined to be monochrome and performing a second procedure on the received image data when the background area is not determined to be color or when the main area is not determined to be monochrome.

10. An image processing method according to claim 9, wherein said first procedure comprises outputting the entire image data as a monochrome image.

11. The image processing method of claim 9, further comprising generating a histogram reflecting the value distribution of the received image data.

12. An image processing method, comprising:

receiving image data of an original document;

determining whether the original document is a color document or monochrome document based on the image data;

detecting a first value distribution based on the entire received image data and a second value distribution based on data of a color portion of the received image data;

comparing the first value distribution with the second value distribution;

determining whether the background area is color and a main area that is not the background area is monochrome based on the result of the comparing; and performing a first procedure on the received image data when the background area is determined to be color and the main area is determined to be monochrome and performing a second procedure on the received image data when the background area is not determined to be color or when the main area is not determined to be monochrome.

13. The image processing method of claim 12, further comprising generating a histogram reflecting the value distribution of the received image data.

14. An image processing apparatus, comprising:

a receiving device receiving image data;

a background discriminating device determining a background portion of the image data;

a determining device determining whether the background portion is based on a color image and a main portion that is not the background portion of the image data is based on a monochrome image; and a transforming device performing a first transforming procedure on the background portion when the background portion is determined to be color and the main portion is determined to be monochrome and performing a second transforming procedure on the entire received image data when the background portion is not determined to be color or when the main portion is not determined to be monochrome.

15. An image processing apparatus, comprising:

a receiving device receiving image data;

a background discriminating device determining a background portion of the image data;

a determining device determining whether the background portion is based on a color image and a main portion that is not the background portion of the image data is based on a monochrome image; and an image forming device performing a first procedure on the received image data for forming a monochrome image when the background portion is determined to be color and the main portion is determined to be monochrome and performing a second image forming procedure on the received image data when the background portion is not determined to be color or when the main portion is not determined to be monochrome.

* * * * *